United States Patent [19]
Scholefield

[11] Patent Number: 5,530,913
[45] Date of Patent: Jun. 25, 1996

[54] MESSAGE DELIVERY IMPROVEMENT FOR DATA COMMUNICATIONS SYSTEM USING SINGLE FREQUENCY REUSE NETWORKS

[75] Inventor: Christopher Scholefield, Delta, Canada

[73] Assignee: Motorola, Inc., Schaumburg, Ill.

[21] Appl. No.: 970,735

[22] Filed: Nov. 2, 1992

[51] Int. Cl.⁶ ........................................... H04B 1/00
[52] U.S. Cl. ........................................ 455/33.4; 455/56.1
[58] Field of Search ..................... 455/33.1, 33.2, 455/33.3, 33.4, 53.1, 54.1, 56.1, 57.1, 51.1, 51.2; 379/58, 59, 60, 63

[56] References Cited

U.S. PATENT DOCUMENTS

| | | | |
|---|---|---|---|
| 4,481,670 | 11/1984 | Freeburg | 455/56.1 |
| 4,525,861 | 6/1985 | Freeburg | 455/56.1 |
| 4,670,906 | 6/1987 | Thro | 455/56.1 |
| 4,829,519 | 5/1989 | Scotton et al. | 371/5 |
| 5,233,643 | 8/1993 | Naeini et al. | 455/33.4 |
| 5,249,304 | 9/1993 | Mulford | 455/57.1 |
| 5,263,177 | 11/1993 | Schieve et al. | 455/33.4 |

*Primary Examiner*—Reinhard J. Eisenzopf
*Assistant Examiner*—Andrew Faile
*Attorney, Agent, or Firm*—Charlie W. Bethards

[57] ABSTRACT

A method of data message delivery for single frequency reuse data communications systems wherein the system after attempting a data message delivery on a reuse path and detecting an absence of a data message confirmation reattempts the data message delivery on a non-reuse path where the non-reuse path is successively selected as one of; the reuse path in a non-reuse mode, a last used path, and a registered, as determined by a portable, path.

6 Claims, 4 Drawing Sheets

MESSAGE DELIVERY IMPROVEMENT FOR DATA COMMUNICATIONS SYSTEM USING SINGLE FREQUENCY REUSE NETWORKS

FIELD OF THE INVENTION

This invention relates to radio data communications including but not limited to an improvement in data message delivery reliability and capacity within such systems.

BACKGROUND OF THE INVENTION

Radio data communications systems are well known in the art. One such system is the single frequency reuse (SFR) system wherein a large geographic area is provided data message delivery service by deploying multiple fixed stations each serving a smaller coverage zone. In the SFR system the fixed stations are often inactive (not transmitting) unless and until needed, the system is coordinated by a network controller, and all radio communications are conducted on a single radio channel. The smaller coverage zones tend to overlap in part to insure service to a portable or mobile station (portable) regardless of present radio signal propagation conditions and in part because the overlap generally is unavoidable in a practical situation. Practitioners, striving to maximize capacity of the SFR radio data communications system (the amount of data message traffic that may be delivered in a given time period), have sought a high degree of reuse and concurrently shunned network overhead.

The rubric, "reuse", for example a reuse data path, implies something about the extent a given radio channel (transmit and receive frequency) is being reused at any point in time at different locations throughout the radio data communications system. Ideally, the highest degree of reuse occurs when all fixed stations, i.e. coverage zones or paths, are simultaneously and independently active, delivering data message traffic. Overhead, undesirable as such, in some sense represents system inefficiencies and comes in varying flavors including, data transport overhead such as synchronization blocks and error coding overhead, system management overhead such as control type interactions with portables, and, effectively, overhead resulting from unsuccessful and therefore subsequent attempts to deliver a data message. Various practical considerations limit the degree of reuse that may be achieved as well as the minimum amount of overhead necessary to provide service.

Such practical considerations include imprecise knowledge of a particular portable location, the overlapping coverage zones, and implications necessarily following therefrom. The portable location knowledge in part defines an optimum, and likely unique, data path, hence fixed station, to be used for a successful data message delivery to a particular portable. To demonstrate, if a data message delivery is unsuccessfully attempted via an inadequate data path as a result of inaccurate portable location knowledge, system capacity may be adversely impacted. Noting perhaps the obvious, such inaccuracy may be the result of simply outdated knowledge that is further complicated by the fact that a portable's and particularly mobile's location may change noticeably over comparatively short periods of time.

Further, since all fixed stations and portables operate on the same channel the extent the ideal may be approached is constrained by the overlapping zones and possible attendant radio signal interference within these zones. Specifically when a portable is deployed in an area served by multiple fixed stations all save one of such fixed stations will normally have to be inactive before the data message may be successfully delivered. In such circumstances the adjacent non-overlapping zones ordinarily served by the inactive fixed stations will be without service during the time required to deliver the data message. To the extent that fixed stations are forced inactive the potential capacity of the system is sub-optimum. To the extent that such inactivity results from an error in the portable location knowledge the impact on capacity is compounded when and if the next attempt is directed to another such overlapping zone.

The network controller, charged with coordinating the system includes, among others, a data message routing function for selecting the appropriate path to attempt a data message delivery to a particular portable. This path selection will depend in part on an estimate of a particular portable location as well as other system activity and may include when to attempt a data message delivery, which fixed station and hence radio path to utilize, and therefore, or additionally, which fixed stations and hence paths to inactivate. The data message routing functions of present day data communications systems, striving to optimize reuse, have tended to emphasize or prioritize reuse data paths and only as a last resort, if ever, select a non-reuse data path. As used herein a non-reuse data path implies that fixed stations serving adjacent overlapping coverage zones and thus adjacent non-overlapping coverage zones are inactivated or forced to forego activation. Furthermore, in order to avoid the overhead associated with more active approaches, the estimate of a particular portable location has been based on history, specifically an evaluation of the portable location that depends on the last data communications transaction with the particular portable.

This evaluation typically depends on each fixed station assessing the portable's signal quality, e.g. signal strength, bit error rate (BER), or reasonable equivalent, as observed at such fixed stations when the portable was last active. Armed with these observations the network controller, normally relying on a weighted average of the observations, will prioritize and rank data paths that would likely result in a successful data message delivery to a portable. When a data message delivery is required the network controller relying on the historical data path rankings and other system traffic can select a data path corresponding to a particular portable for a data message delivery attempt. If the attempt is unsuccessful, i.e. the portable does not confirm (acknowledge) the delivery attempt, the next best data path may be utilized, etc. etc. Without more, there is no guarantee the data message will ever be delivered using these procedures. Clearly each unsuccessful attempt represents overhead or system inefficiency in that no useful communications has occurred and system capacity has been used.

Other considerations being equal, the likelihood that a given attempt will be unsuccessful depends on the extent the portable location estimate has become stale or obsolete. Potential problems notwithstanding, this system operates reasonably efficiently and avoids the overhead associated with more active approaches, such as continued periodic portable transmissions, so long as the average time between deliveries to a particular portable is less than the average time required for the corresponding portable location estimate to become stale. When these conditions are not satisfied, for example in a system providing occasional data message delivery service to each of a multiplicity of portables, available system capacity may degrade significantly due to the large number of repeated delivery attempts required. Furthermore, where virtual absolute delivery reliability is a requirement the above approach without more is insufficient. Clearly a need exists for data message delivery improvements in data communications systems using SFR networks.

SUMMARY OF THE INVENTION

This invention addresses the aforementioned needs by teaching a method used in a single frequency reuse radio data communications system wherein the system is coordinated by a network controller and adapted for reliable data message delivery to portables throughout a geographic area. The method includes attempting a data message delivery over a reuse path; detecting an absence of a data message confirmation, the confirmation being indicative of a successful delivery; and reattempting, in response to the absence of a data message confirmation, the data message delivery over a non-reuse path.

A further embodiment selects the non-reuse path by: identifying, at a portable, a preferred path having a corresponding quality metric that satisfies a preferred threshold; assessing a last quality metric for a last used path, use of such path having resulted in a last successful delivery to the portable; and transmitting, when the last quality metric satisfies a registration threshold, a registration packet including the preferred path to the network controller for subsequent use as a registered path.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

DETAILED DESCRIPTION OF A PREFERRED EMBODIMENT

Figure 1:
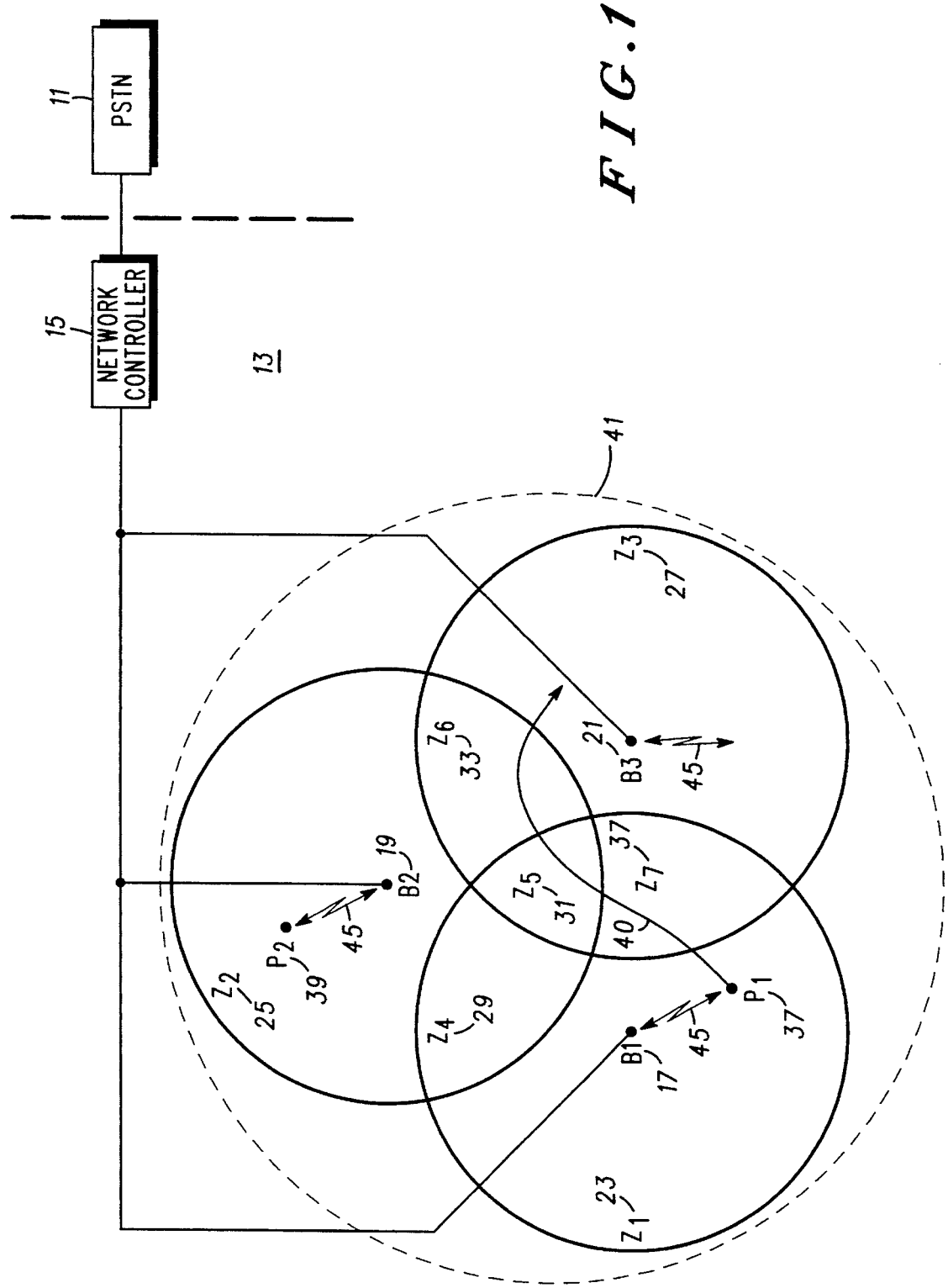
FIG. 1 is an exemplary diagram of a SFR system including coverage zones within the SFR system.

In FIG. 1 a data message source (11), such as a public switched data network, public switched telephone network, or dispatch center, etc., is shown coupled to an exemplary radio data communications system (13). This communications system includes a network controller (15), responsible for coordinating the system, that is coupled to fixed stations B1, B2, and B3 (17, 19, and 21). The fixed stations B1, B2, and B3 (17, 19, and 21) respectively provide data message delivery service to and from coverage zones Z1, Z2, and Z3 (23, 25, and 27) as well as service to overlapping coverage zones Z4, Z5, Z6, and Z7 (29, 31, 33, and 35). Specifically, as depicted, fixed stations B1 (17) and B2 (19) both provide service to Z4 (29); fixed stations B2 (19) and B3 (21) both provide service to Z6 (33); fixed stations B1 (17) and B3 (21) both provide service to Z7 (35); and fixed stations B1, B2, and B3 (17, 19, and 21) all provide service to Z5 (31). The FIG. 1 system is understood to be an exemplary and simplified system advanced to increase the understanding and appreciation of the instant invention and should not be construed to reflect an actual system, a practical system, nor in any way to limit the true scope and spirit of the instant invention. Practical systems, for example, may have additional fixed stations giving rise to additional overlapping and non-overlapping coverage zones.

In operation the radio data communications system (13) is coordinated by network controller (15) and adapted to provide reliable data message delivery to portable, P1, P2 (37, 39) or mobile terminals (portables) throughout a geographic area (41) regardless of whether the portables are relatively stationary or moving, such as P1's (37) motion depicted by line (43). As noted above, in a single frequency reuse (SFR) radio data communications system, such as system (13), all radio communications are conducted on a single radio channel (f1) (45), regardless of what fixed station is communicating with what portable. This channel may include a receive and a transmit frequency in for example the 50, 150, 450, or 800 MHz frequency bands. A significant function of the network controller (15), following from the single frequency used as well as the mobility of the portables, is data message routing via the appropriate path, specifically which fixed station to enable for a data message delivery to a particular portable at a particular time.

This data message routing function should consider the particular portables actual location and thus may entail disabling or foregoing enabling other fixed stations when such location is within an overlapping coverage zone. To demonstrate, consider P1 (37) following line (43) and moving from coverage zone Z1 (23) to Z7 (37) to Z5 (31) to Z6 (33) and finally to Z3 (27). While P1 (37) is actually located in Z1 (23) the data path (path) originating at or from B1 (17) is the appropriate path for the network controller to use for data message delivery to P1 (37). Furthermore this is or can be a reuse path in that fixed stations serving adjacent coverage zones, such as, B2 and B3 (19 and 21) can be enabled for concurrent delivery of other data messages to other portables, for example B2 (19) can simultaneously deliver a data message to P2 (39) without affecting communications between P1 (37) and B1 (17).

However when P1 (37) is located in overlapping coverage zone Z7 (37) the network controller may enable either B1 (17) or B3 (21) but will likely need to disable or forego enabling the other fixed station during a data message delivery attempt to P1 (37). When adjacent fixed stations, specifically those suitable for serving an overlapping coverage zone, such as B3 for the Z7 zone, are disabled or forced inactive (forego enabling) during a data message delivery attempt the path used, originating with the enabled fixed station, here B1, is a non-reuse path. Even in these circumstances some reuse paths may still be available. For example, under these circumstances, B1 active, B2 (19) could remain active, as above, and data paths originating at B2, to provide service to, for example, P2 (39) would be considered reuse paths.

Similarly in Z5 (31) a non-reuse path is appropriate in that one of the three stations can be enabled and the remaining adjacent fixed stations likely must be inactive during a data message delivery attempt. In Z6 (33) either B2 or B3 (19 or 21) may be enabled and the other disabled while B1 (17) can remain active. Finally when P1 (37) is located within Z3 (27) the appropriate path originates at B3 (21) and may be a reuse path in that fixed stations B1 and B2 (17 and 19) can be independently and simultaneously active delivering other data messages. From the foregoing discussion it is clear that successful data message deliveries and hence minimizing overhead due to subsequent reattempted deliveries depends on an accurate estimate of a portable location.

Figure 2:
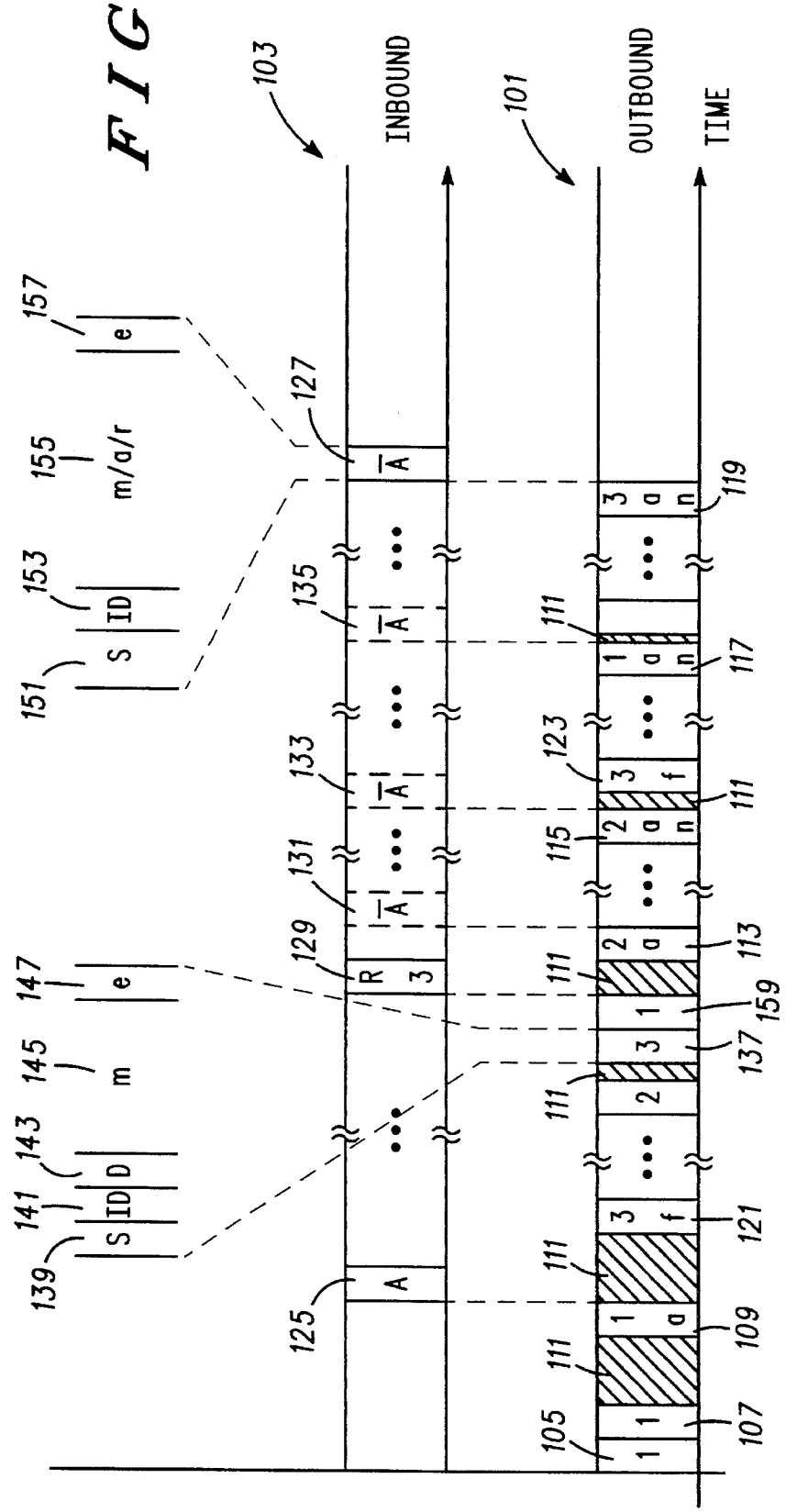
FIG. 2 is an exemplary data packet diagram of the data on the SFR channel.

Referring to FIG. 2, relevant portions of a series of data packets are depicted in broken time line fashion as an outbound (fixed to portable) channel (101) and an inbound (portable to fixed) channel (103). The data packets (105, 107, 109, . . . ) may be separated by periods of inactivity (111) and represent the data packets including corresponding data messages on the SFR outbound channel and available for observation by portables, specifically portable P1 (37) located initially in overlapping coverage zone Z7 (37) and moving along line (43) through zones Z5 (31) and Z6 (33) to Z3 (27). Each segment (bounded by one or more breaks) of the FIG. 2 time line corresponds roughly and sequentially to P1's (37) tenure within respectively Z7, Z5, Z6, and Z3. Data packets designated 1, 2, or 3 originated, respectively, at fixed stations B1, B2, or B3 (17, 19, or 21). Portable P1 (37) assesses a quality metric such as signal strength, bit error rate (BER), or equivalent, for each data packet observed.

This assessment includes a corresponding fixed station identifier and may use either well known techniques for measuring signal strength, a comparison of observed bits with a predetermined expected bit pattern, or a Hamming distance for an observed pattern. These quality metrics may be used individually or in some combination, such as a weighted average, to associate a quality metric with a path originating with each fixed station B1, B2, or B3 (17, 19, or 21) for the relevant time period. For example, quality metrics for data packets (105, 107 and 109) could be used individually or averaged to associate a quality metric with a path originating at fixed station B1 (17) during the relevant time period.

Data packets additionally labelled "a" (109, 113, 115, 117, 119) are directed to P1 (37) and those additionally labelled "n" (115, 117, 119) indicate a non-reuse (adjacent fixed stations forced inactive) path was employed. Data packets additionally labelled "f" (121, 123) are filler messages from the corresponding fixed stations. Such messages are transmitted by the fixed stations when they have been inactive for a predetermined time, identify a particular fixed station, and may be used by portables to assess the quality metric for a path originating at that fixed station. While not specifically depicted, in the interest of simplicity, an unacknowledged (unconfirmed) message on the outbound channel, such as data packet (113) may be repeated using the same path a number of times, for example 2, 3, 4. Such repetition of the message delivery attempt over the same path is known as retransmission and is a well recognized technique relied upon by practitioners, albeit with varying parameters depending on specific circumstances, to increase delivery reliability.

Referring to the inbound channel (103), data packets depicted are limited to those germane to the instant invention, originate at a portable such as P1 (37), and include those labelled "A" (125, 127), signifying acknowledgment (confirmation) of the immediately preceding data packet on the outbound channel (101), here data packets (109, and 119) respectively. Thus data packet (125) on the inbound channel (103) is an acknowledgment or confirmation to the data communications system (13) that portable P1 (37) successfully received data packet (109), more specifically the data message included therewith, that originated at fixed station B1 (17). Data packet (129) designated "R" and "3" represents a registration message from P1 (37) designating B3 (21) as a preferred path for subsequent data message deliveries. Further as previously explained, data packet (125, 129) and all others originating at portable P1 (37) may be used by the system (13) to update the system's estimate of the portable location for P1 (37).

Data packet slots (131, 133, 135) depicted with dashed vertical lines and labeled "$\overline{A}$" represent the absence of a confirmation of the immediately preceding data packet on the outbound channel (101). For example data packet (113) from B2 (19) was intended for P1 (37) and thus the system (13) expected, to no avail, a confirmation thereof from P1 (37) during data packet slot (131). Similarly confirmations were expected and not forthcoming during data packet slots (133, 135).

The balance of FIG. 2 includes an expanded view of the structure of representative data packets. Data packet (137) included on the outbound channel (101) begins with a synchronization field (139) that allows the portable (37) to synchronize its decoding time references to this data packet (137). The synchronization field (139) is followed by an ID field (141), for identifying the source, fixed station, here B3 (21), of the data packet (137) and in turn a destination field (143) that specifies the portable or portables to which this data packet is directed. Completing the data packet is a message field (145) representing ordinarily, the payload of the data packet followed lastly by an end of packet field (147) that may be nothing other than a predetermined number of data bits. This data packet (137), due in part to the ID field (141), may be used by all portable terminals within range of B3 (21) to assess a quality metric for the path originating at B3 (21).

Considering a data packet on the inbound channel (103), such as data packet (127), it in part mirrors the outbound packet and begins with a synchronization field (151) for synchronization of fixed stations and is followed by a source ID field, for identifying the portable, here P1 (37). These fields are followed by a data message field (155) that may include ordinary payload type data, a acknowledge format for data packet (127), or a registration format for data packet (129) that identifies a preferred path for the identified portable.

Figure 3:
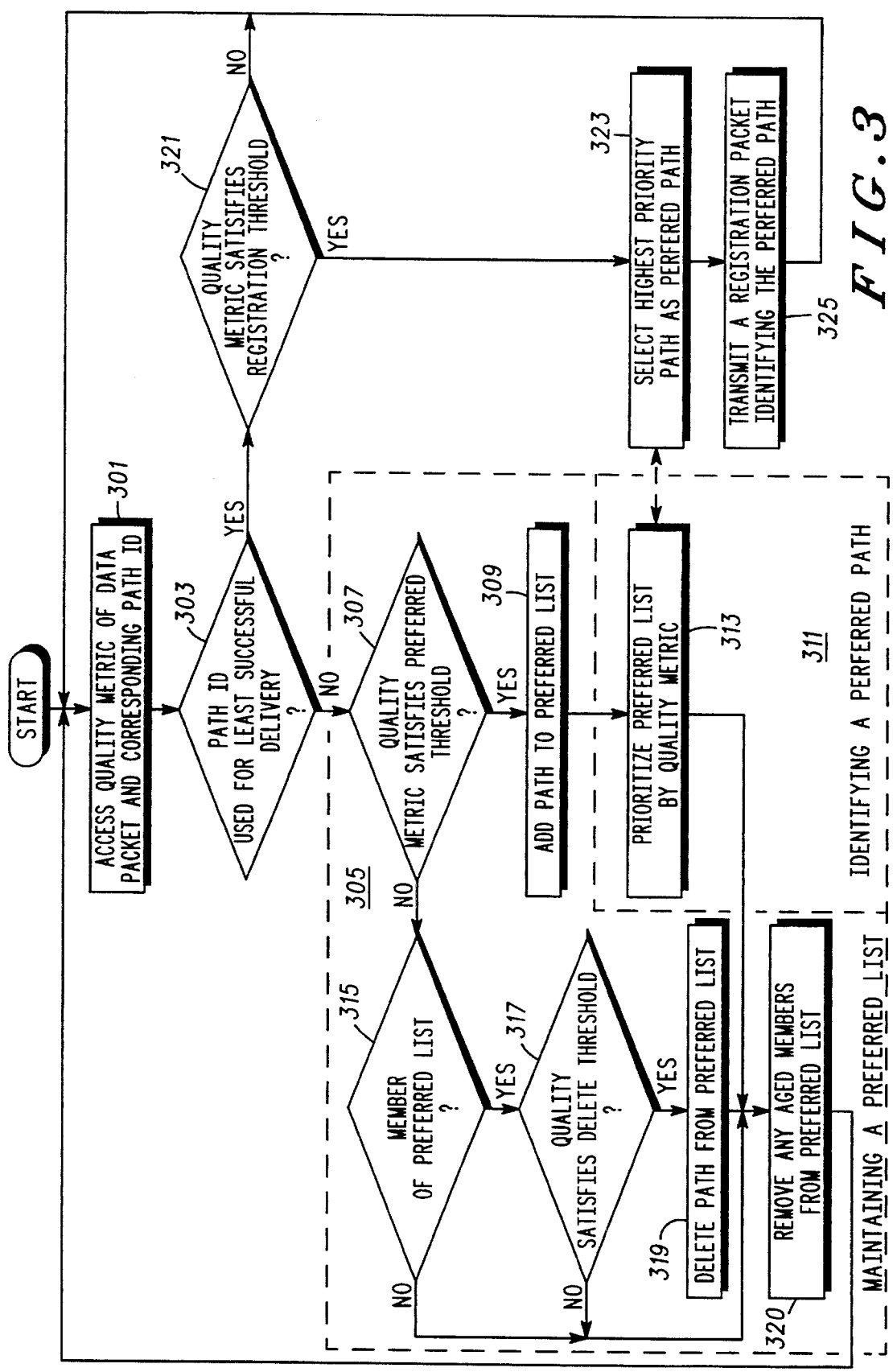
FIG. 3 is a process flow diagram of a preferred path selection and registration process in accordance with an embodiment of the instant invention.

Referring now to FIG. 3 a preferred path selection and registration process diagram intended for implementation as a software program to be executed by a microprocessor based logic unit (not specifically shown) within P1 (37) is entered at X (301). This process begins by assessing a quality metric for a data packet, for example data packet (107) and a corresponding path or fixed station ID (via the ID field (141)), here B1 (17) at step (303). Next at step (305) the path Id is tested to determine if this path was used for the last successful delivery to the portable. If not, and for the sake of discussion let us presume not, the process enters a maintenance of a preferred list mode at step (305). Step (305) is directed to, in our example considering data packet (107), determining whether the data path originating at B1 (17) should be a member of the preferred list.

Maintenance of the preferred list (305) includes testing the quality metric from (301) to determine if a preferred threshold is satisfied at (307). If so, the corresponding path is added to a preferred list at (309) and a preferred path is identified at (311) by prioritizing or rank ordering the preferred list in accordance with the quality metric at (313) and thereafter returning to step (301). If the preferred threshold is not satisfied at (307) the path ID is tested to determine if the path is already a member of the preferred list at (315). If so the quality metric is further tested to determine if it satisfies a delete threshold at (317) and if so the path is deleted from the preferred list at step (319) after which the process continues to step (320). If either the path is not a member of the preferred list at step (315) or the delete threshold is not satisfied at step (317) the process continues to step (320). At step (320) all aged members are removed from the preferred list in order to account for the fixed stations that are no longer able to provide a data path that allows assessment of a quality metric. This removal can ordinarily be provided for by an appropriate choice of a weighted average of previously assessed quality metrics corresponding to the data path wherein the weighted average is a function of time. From step (320) the process begins anew with step (301).

Returning to process step (303), suppose a path ID was used for the last successful data message delivery, such as some time subsequent to data packet (125) acknowledging data packet (109), for example data packet (159). In this case the quality metric is compared to a registration threshold at (321). If the registration threshold is not satisfied the process returns to step (301). If satisfied, indicating registration is required, the highest priority path is selected from the prioritized preferred list at (323), a registration packet identifying the preferred path as a registered path is transmitted by P1 (37) at step (325). As an example of the FIG. 2 process, the data packet (129), registering P1 on a data path originating at B3, was transmitted, evidently in response to data packet (159) having a quality metric which satisfied the registration threshold of (321) and subsequent to a determination, relying on data packet (137), that a data path originating at B3 was the preferred path The FIG. 4 data message delivery process is intended to be executed by the network controller via, for example, a software program executable by a processor based logic unit (not specifically shown) therein. This process begins at (401) with the recognition that a data message delivery is required. With reference to FIG. 2, such recognition occurred some time prior to the data packet (113), for example when the data packet (129) was observed by the system (13). A reuse path that corresponds to the destination portable, here a data path that originates at B2 (19) for the destination portable P1 (37), is selected at (403) by, for example, selecting the highest quality path based on the assessment conducted when P1 last transmitted. A data message delivery attempt, i.e. data packet (113), via the reuse path (adjacent fixed stations B1 and B3 (17 and 21) remain active as required) is undertaken at step (405). The observation of data packet (129), above, evidently indicated that the data path originating at B2 (19) was appropriate for data message delivery to P1 (37). If, responsive to the attempt of (405), a data message confirmation, indicative of a successful delivery, is observed by the data communications system (13) at (407) the process returns to (401).

Figure 4:
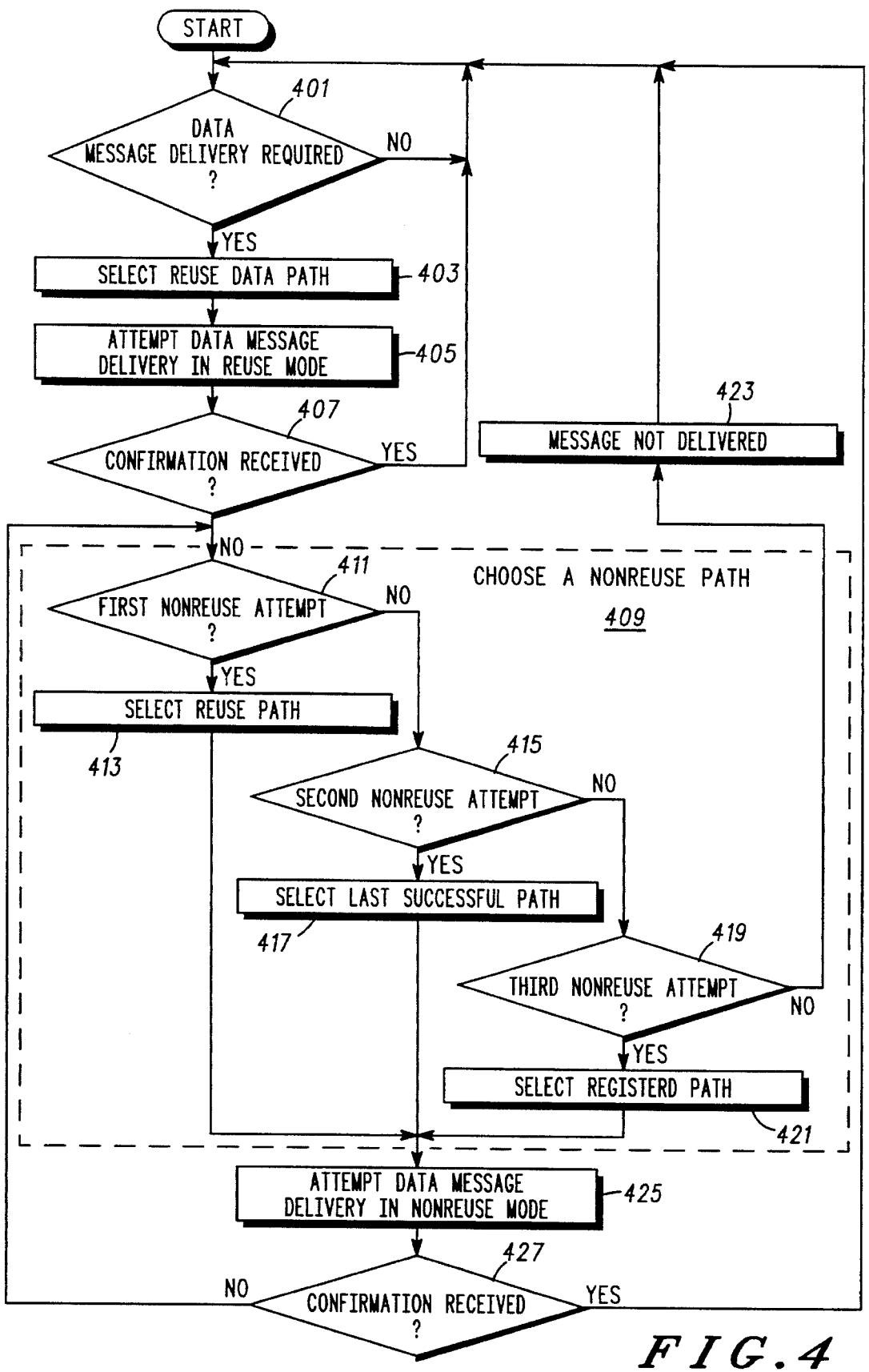
FIG. 4 is a process flow diagram of a data message delivery process in accordance with an embodiment of the instant invention.

When the confirmation of (407) is not forthcoming, indicated by the absence of an acknowledgement data packet, i.e. data packet slot (131), the FIG. 4 process chooses a non-reuse path at (409). Choosing the non-reuse path may be a multistep procedure and includes determining whether this is the first non-reuse attempt at step (411). If this is the first non-reuse attempt, the previously used reuse path is selected at (413) for subsequent utilization as a non-reuse path as further explained below. If this is the second non-reuse attempt determined at (415), the last successful path is selected at (417). Referring to FIG. 2, the last successful path may correspond to B1 (17) as a result of data packet (109) having been successfully delivered as evidenced by the acknowledgement of data packet (125). If this is the third non-reuse attempt, determined at step (419), the registered path is selected at (421). The registered path here corresponds to B3 (21) as indicated by the registration data packet (129). If more than three data message delivery attempts have been undertaken the message is flagged as not delivered at (423), suggesting perhaps the portable is out of range or service, and the process returns to (401).

Given a non-reuse path or data path to be used in a non-reuse mode, has been chosen at step (413, 417, or 421) an attempt to deliver the data message using the selected non-reuse path (adjacent fixed stations forced inactive) is undertaken at (425). If a confirmation of the delivery attempt is observed at (427), the process returns to (401) and otherwise returns to (409). The FIG. 4 process, beginning with the absence of a confirmation at step (407) is demonstrated by way of example in FIG. 2, starting with data packet slot (131). Data packet (115) is a data message delivery attempt in a non-reuse mode per (425) on the reuse path (compare data packet (113)) as selected at (413) because this is the first non-reuse attempt as determined at (411). No confirmation was forthcoming at (427), evidenced by the data packet slot (133), and a second non-reuse attempt, determined at (415) and evidenced by data packet (117), on the last successful path, selected at (417) and corresponding to B1 (17), has been undertaken per (425). Again no confirmation was forthcoming at (427), evidenced by the data packet slot (135), and a third non-reuse attempt, determined at (419) and evidenced by data packet (119), on the registered path, selected at (421) and corresponding to B3 (21) per registration data packet (129), has been undertaken per (425). This third attempt on the registered path has been confirmed per (427) as evidenced by the acknowledgement data packet (127).

While the FIG. 4 data message delivery process is a preferred embodiment of the instant invention it will be clear to those of ordinary skill in the art that many variants within the true scope and spirit of the instant invention are possible. Such variants that provide the sought after advantages of the instant invention, namely enhanced message delivery reliability concurrent with or in addition to a decrease in data message delivery overhead will likely depend on the specific data message traffic characteristics associated with a particular data communications system or a particular portable. As one of but two examples, consider a portable that routinely and frequently interacts with the system and or very seldom changes coverage zones. Delivering a data message to such a portable(s) would seldom require supplementary knowledge (knowledge beyond what the prior art path selection process provides) and thus incurring significant additional system overhead associated with portable registration may be sub optimum. Therefore registration, in these circumstances, should be minimized by, for example adjusting the registration threshold at step (321).

Alternatively, if a significant portion of the portables serviced by the system or identified portables seldom require data message delivery service and or routinely change coverage zones, registration may be important in reducing system overhead, due to unsuccessful data message delivery attempts, and it may be appropriate to reorder the non-reuse path selection priority. For example in these circumstances, minimizing overhead and or increasing data message delivery reliability may best be accomplished by initially selecting the registered path as the non-reuse path at step (413), rather than selecting the reuse path in a non-reuse mode. The optimum data message delivery processes and registration processes for a specific portable or a specific system will thus be dependent on the actual data message delivery requirements given particular circumstances. All such variants by taking advantage of the overhead and reliability improvements for data communications systems as taught by the instant invention are considered to be within the true scope and spirit of the same.

What is claimed is:

1. In a single frequency reuse radio data communications system having multiple fixed stations all operating on a channel with each fixed station arranged to provide data communications over a data path to a corresponding coverage zone, the coverage zones collectively defining a geographic area, the system coordinated by a network controller and adapted for reliable data message delivery to portables throughout a geographic area, a method of message delivery including the steps of:

attempting a data message delivery to a portable over a reuse data path;

detecting an absence of a data message confirmation, said confirmation indicative of a successful delivery to said portable;

selecting a non-reuse data path;

registering said portable on said non-reuse data path, including identifying, at said portable, a preferred path having a corresponding quality metric that satisfies a preferred threshold, assessing a last quality metric for a last used path, use of such path having resulted in a last successful delivery to said portable, and transmitting, when said last quality metric satisfies a registration threshold, a registration packet including said preferred path to the data communications system for subsequent use as a registered path; and reattempting, in response to said absence of a data message confirmation, said data message delivery over a non-reuse data path, said non-reuse data path defined to require any other data path providing overlapping service to a coverage zone corresponding to said non-reuse data path to forego activation.

2. The method of claim 1 wherein said non-reuse data path is selected to be said reuse data path operating in a non-reuse mode.

3. In a single frequency reuse radio data communications system having multiple fixed stations all operating on a channel with each fixed station arranged to provide data communications over a data path to a corresponding coverage zone, the coverage zones collectively defining a geographic area, the system coordinated by a network controller and adapted for reliable data message delivery to portables throughout a geographic area, a method of message delivery including the steps of:

attempting a data message delivery to a portable over a reuse data path;

detecting an absence of a data message confirmation, said confirmation indicative of a successful delivery to said portable; and reattempting, in response to said absence of a data message confirmation, said data message delivery over a non-reuse data path, said non-reuse data path defined to require any other data path providing overlapping service to a coverage zone corresponding to said non-reuse data path to forego activation, wherein said non-reuse data path is selected as a last used data path, use of such data path having resulted in a last successful delivery to said portable.

4. In a single frequency reuse radio data communications system having multiple fixed stations all operating on a channel with each fixed station arranged to provide data communications over a data path to a corresponding coverage zone, the coverage zones collectively defining a geographic area, the system coordinated by a network controller and adapted for reliable data message delivery to portables throughout a geographic area, a method of message delivery including the steps of:

selecting a reuse data path;

attempting a data message delivery over said reuse data path;

detecting an absence of a data message confirmation, said confirmation indicative of a successful data message delivery;

choosing a non-reuse data path, said non-reuse data path defined to require any other data path providing overlapping service to a coverage zone corresponding to said non-reuse data path to forego activation, including selecting a last successful path as said non-reuse data path; and reattempting, in response to said absence, said data message delivery over said non-reuse data path.

5. The method of claim 4 wherein the step of choosing further includes selecting said reuse data path for use in a non-reuse mode.

6. The method of claim 4 wherein said reattempting step further includes the steps of:

repeating said detecting step;

choosing a second non-reuse data path; and repeating said reattempting step.

* * * * *